United States Patent
Hasuo et al.

(10) Patent No.: US 9,225,228 B2
(45) Date of Patent: Dec. 29, 2015

(54) METHOD OF MANUFACTURING LAMINATED STATOR CORE AND LAMINATED STATOR CORE MANUFACTURED BY THE METHOD

(75) Inventors: Yusuke Hasuo, Kitakyushu (JP); Shinya Sano, Toyota (JP); Eiji Yanagida, Toyota (JP)

(73) Assignees: MITSUI HIGH-TEC, INC., Kitakyushu-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 320 days.

(21) Appl. No.: 13/997,349

(22) PCT Filed: Feb. 2, 2012

(86) PCT No.: PCT/JP2012/052910
§ 371 (c)(1),
(2), (4) Date: Jun. 24, 2013

(87) PCT Pub. No.: WO2012/111515
PCT Pub. Date: Aug. 23, 2012

(65) Prior Publication Data
US 2013/0293060 A1 Nov. 7, 2013

(30) Foreign Application Priority Data

Feb. 14, 2011 (JP) ................................. 2011-029018

(51) Int. Cl.
*H02K 15/02* (2006.01)
*H02K 1/18* (2006.01)
*B21D 28/06* (2006.01)
(Continued)

(52) U.S. Cl.
CPC ................ *H02K 15/02* (2013.01); *B21D 28/06* (2013.01); *H02K 1/12* (2013.01); *H02K 1/16* (2013.01); *H02K 15/024* (2013.01); *H02K 2213/03* (2013.01); *Y10T 29/49009* (2015.01)

(58) Field of Classification Search
CPC ....... H02K 15/02; H02K 15/028; H02K 1/12; H02K 1/18; H02K 1/185
USPC ......... 310/254.1, 216.111, 216.113, 216.118; 29/596
See application file for complete search history.

(56) References Cited

U.S. PATENT DOCUMENTS 3,588,561 A * 6/1971 Hoffmeyer et al. .... 310/216.111
2011/0024489 A1 2/2011 Sakakibara et al.
(Continued)

FOREIGN PATENT DOCUMENTS

CN 201584862 U 9/2010
CN 201708600 U 1/2011
(Continued)

OTHER PUBLICATIONS

International Search Report dated May 1, 2012, issued in corresponding application No. PCT/JP2012/052910.
(Continued)

*Primary Examiner* — Michael Andrews
(74) *Attorney, Agent, or Firm* — Westerman, Hattori, Daniels & Adrian, LLP

(57) ABSTRACT

A method of manufacturing a laminated stator core and a laminated stator core manufactured by the method, the method capable of forming a recess 21 over one or both of (a) a lateral portion of an ear piece C of the stator core sheet A to be formed adjacent to the stator core sheet B and (b) a peripheral portion of the annular yoke piece D continuing to the lateral portion, the peripheral portion beside the ear piece C; fitting one ear piece E of the stator core sheet B with a gap in the recess 21; and thereby improving a material yield when the stator core sheets 13 are formed from the strip material 14.

10 Claims, 11 Drawing Sheets

(51) Int. Cl.
*H02K 1/16* (2006.01)
*H02K 1/12* (2006.01)

(56) References Cited

U.S. PATENT DOCUMENTS

2012/0153768 A1* 6/2012 Sanji et al. ............. 310/216.009
2012/0175996 A1* 7/2012 Ikuta et al. ...................... 29/596
2012/0223610 A1* 9/2012 Kalluf et al. ................ 310/254.1

FOREIGN PATENT DOCUMENTS

| JP | 52-100103 U1 | 1/1976 |
|----|--------------|--------|
| JP | 02-188138 A  | 7/1990 |
| JP | 05-336710 A  | 12/1993 |
| JP | 2840268 B2   | 12/1998 |
| JP | 2007-159300 A | 6/2007 |
| JP | 2007-181297 A | 7/2007 |

OTHER PUBLICATIONS

Office Action dated Jan. 6, 2015, issued in corresponding Chinese Patent Application No. 201280005674.X, with English translation (10 pages).

* cited by examiner (A)

Prior Art (B)

METHOD OF MANUFACTURING LAMINATED STATOR CORE AND LAMINATED STATOR CORE MANUFACTURED BY THE METHOD

TECHNICAL FIELD

The present invention relates to a method of manufacturing a laminated stator core from a strip material with a high yield (i.e., with a small amount of scraps) and a laminated stator core manufactured by the method.

BACKGROUND ART

A laminated stator core for an inner-rotor-type rotating machine, such as a motor and a power generator installed in a hybrid car etc., is fixed to a housing by bolts. And, the bolts are inserted into bolt-holes formed in a plurality of projecting portions (hereinafter referred to as ears), which are located in a circumferential direction of a yoke of the laminated stator core and project radially outward from an outer periphery of the yoke (see Patent Document 1, for example).

In order to manufacture the laminated stator core having the plural ears in the outer periphery of the yoke from a strip material with a high yield (i.e., with a small amount of scraps), for example, Patent Document 2 discloses a method of forming (punching out) from the strip material plural lines of stator core sheets having plural ear pieces, which are laminated to form the ears, in a circumferential direction of an annular yoke piece.

PRIOR ART DOCUMENTS

Patent Document

[Patent Document 1] Japanese Unexamined Patent Application Publication No. 2007-159300
[Patent Document 2] Japanese Patent No. 2840268

SUMMARY OF INVENTION

Problems to be Solved by the Invention

In order to effectively yield the stator core sheets from the strip material, a layout (positioning) of the ear pieces in the strip material is important in the formation of the stator core sheets from the strip material.

For example, as shown in FIG. 10 (A), a stator core sheet 102 includes three ear pieces 100 located in a circumferential direction of an annular yoke piece 101 at equal spaces. When the stator core sheets 102 is formed in one line from a strip material 103 using a punching die, the following well-known layout of the adjacent stator core sheets 102 improves the material yield: a tip of the ear piece 100 of one stator core sheet 102 faces a connecting portion between the ear piece 100 and the annular yoke piece 101 of the other stator core sheet 102. As shown in FIG. 10 (B), when the stator core sheets 102 are formed in two lines from a strip material 104 using the punching die, the following well-known layout improves the material yield: the ear piece 100 of the stator core sheet 102 located in one side in a width direction of the strip material 104 is placed in a gap between the longitudinally-adjacent (i.e., line-symmetric) stator core sheets 102 located in the other side in the width direction of the strip material 104.

As shown in FIG. 11, if a gap Δ between the adjacent stator core sheets 102 in a longitudinal direction of the strip material 104 is excessively reduced for a further improvement of the material yield of the stator core sheets 102, the ear pieces 100 of the adjacent stator core sheets 102 in the longitudinal direction of the strip material 104 are interfered with each other (i.e., overlapped with each other), and thus a minimal value of the gap Δ is limited (i.e., the gap between the stator core sheets 102 cannot be narrowed). Therefore, the material yield cannot be improved beyond a certain level (i.e., the amount of the scraps cannot be decreased).

The present invention has been made in view of the above circumstances and has an object to provide a method of manufacturing a laminated stator core from a strip material with a high yield and a laminated stator core manufactured by the method.

Means for Solving Problems

To accomplish the above object, a first aspect of the present invention provides a method of manufacturing a laminated stator core, including forming stator core sheets in one or more lines from a strip material, each of the stator core sheets having an annular yoke piece and chevron-shaped ear pieces, the ear pieces located around the annular yoke piece at equal spaces in a circumferential direction, the ear pieces projecting radially outward from the annular yoke piece, each of the ear pieces having a through-hole; and laminating the plural stator core sheets to form the laminated stator core, the laminated stator core having an annular yoke formed by laminating the annular yoke pieces and ears formed by laminating the ear pieces, the ears located in a circumferential direction of the annular yoke, each of the ears having a bolt-hole formed by the through-holes; the method comprising: forming a recess over one or both of (a) a lateral portion of at least one ear piece C of the stator core sheet A to be formed adjacent to the stator core sheet B and (b) a peripheral portion of the annular yoke piece D continuing to the lateral portion, the peripheral portion beside the ear piece C; forming the stator core sheet B such that one ear piece E of the stator core sheet B is fitted with a gap in the recess of the stator core sheet A; and thereby improving a material yield when the stator core sheets are formed from the strip material.

To accomplish the above object, a second aspect of the present invention provides a method of manufacturing a laminated stator core, including forming stator core sheets in one or more lines from a strip material, each of the stator core sheets having an annular yoke piece and chevron-shaped ear pieces, the ear pieces located around the annular yoke piece at equal spaces in a circumferential direction, the ear pieces projecting radially outward from the annular yoke piece, each of the ear pieces having a through-hole; and laminating the plural stator core sheets to form the laminated stator core, the laminated stator core having an annular yoke formed by laminating the annular yoke pieces and ears formed by laminating the ear pieces, the ears located in a circumferential direction of the annular yoke, each of the ears having a bolt-hole formed by the through-holes; the method comprising: forming a recess over one or both of (a) a lateral portion of at least one ear piece C of the stator core sheet A to be formed adjacent to the stator core sheet B and (b) a peripheral portion of the annular yoke piece D continuing to the lateral portion, the peripheral portion beside the ear piece C; forming the stator core sheet B such that one ear piece E of the stator core sheet B is fitted with a gap in the recess of the stator core sheet A; reducing a width of the gap by eliminating a tip of the ear piece E; and thereby improving a material yield when the stator core sheets are formed from the strip material.

In the method of manufacturing the laminated stator core according to the first and second aspects of the present invention, it is preferable that the recess has a circular-arc shape.

In the method of manufacturing the laminated stator core according to the first and second aspects of the present invention, it is preferable that the width of the gap is two to twenty times a thickness of the strip material.

If the width of the gap is less than two times the thickness of the strip material, positioning accuracy of the strip material is worsened, and only when the stator core sheets are formed by punching, it becomes difficult to feed the strip material. If the width of the gap exceeds 20 times the thickness of the strip material, the adjacent stator core sheets are formed with a gap wider than necessary, which prevents the improvement of the material yield.

In the method of manufacturing the laminated stator core according to the first and second aspects of the present invention, it is preferable that a width of an area between the through-hole and the recess formed in the ear piece C is equal to or larger than a difference between a flange radius of a bolt to be inserted in the bolt-hole and a radius of the through-hole.

To accomplish the above object, a third aspect of the present invention provides a laminated stator core manufactured by the method of manufacturing the laminated stator core according to the first aspect of the present invention, comprising: a cutout formed in a part of one or both of the ear and the annular yoke along a laminating direction.

To accomplish the above object, a fourth aspect of the present invention provides a laminated stator core manufactured by the method of manufacturing the laminated stator core according to the second aspect of the present invention, comprising: a cutout formed in a part of one or both of the ear and the annular yoke along a laminating direction; and a flat cutout formed in a part of a tip of the ear other than the ear having the cutout along the laminating direction.

Effect of the Invention

In the method of manufacturing the laminated stator core according to the first aspect of the present invention and the laminated stator core according to the third aspect of the present invention, the material yield is improved when the stator core sheets are formed from the strip material, and the strip material having a narrower width than the conventional material is used. Thus, the use of the strip material and the material cost can be reduced. To form the adjacent stator core sheets A, B in the strip material, one ear piece E of the stator core sheet B is fitted in the recess formed in the stator core sheet A, and the width of the gap between the stator core sheets A, B is narrowed. Thus, the use of the strip material and the material cost can be cut down. When the stator core sheets A, B are formed by the punching die, the size of the punching die can be small, and thus the cost of the punching die can be also cut down. The small punching die allows the downsizing of the press machine, and thus the cost of the press machine can be also decreased. As a result, the manufacturing cost of the laminated stator core can be further reduced.

Now, to form the stator core block, every stator core sheet or every several stator core sheets are rotated and laminated one on another such that the ear pieces C are vertically aligned. In this way, the cutouts of the laminated stator core blocks are located in different parts of the laminated stator core when the laminated stator core is formed with the plural laminated stator core blocks. Therefore, a boundary surface between the laminated stator core blocks can be visually confirmed with ease.

In the method of manufacturing the laminated stator core according to the second aspect of the present invention and the laminated stator core according to the fourth aspect of the present invention, the material yield is further improved when the stator core sheets are formed from the strip material, and the strip material having a narrower width than the conventional material is used. Thus, the use of the strip material and the material cost can be further reduced. To form the adjacent stator core sheets A, B in the strip material, one ear piece E without the tip of the stator core sheet B is fitted in the recess formed in the stator core sheet A, and the width of the gap between the stator core sheets A, B is narrowed. Thus, the use of the strip material and the material cost can be further cut down. When the stator core sheets A, B are formed by the punching die, the size of the punching die can be small, and thus the cost of the punching die can be also reduced. The small punching die allows the downsizing of the press machine, and thus the cost of the press machine can be also reduced. Also, it is not necessary to replace the existing press machine with a new press machine corresponding to the larger-sized punching die. As a result, the manufacturing cost of the laminated stator core can be further reduced.

When the laminated stator core is formed by rotating and laminating the plural laminated stator core blocks such that the ear pieces are vertically aligned, the cutouts and flat cutouts of the laminated stator core blocks are located in different parts of the laminated stator core. Therefore, a boundary surface between the laminated stator core blocks can be visually confirmed with ease.

In the method of manufacturing the laminated stator core according to the first and second aspects of the present invention, if the recess has the circular-arc shape, an interference between the recess and the ear piece E is prevented, and thus the width of the gap therebetween can be small.

In the method of manufacturing the laminated stator core according to the first and second aspects of the present invention, if the width of the gap is two to twenty times a thickness of the strip material, then the stator core sheets can be formed accurately with the improved material yield.

In the method of manufacturing the laminated stator core according to the first and second aspects of the present invention, if the width of the area between the through-hole and the recess both formed in the ear piece C is equal to or larger than the difference between the flange radius of the bolt to be inserted in the bolt-hole and the radius of the through-hole, the deformation of the ear pieces can be prevented and the deterioration in strength of the ears formed with the ear pieces can be avoided.

BRIEF DESCRIPTION OF DRAWINGS

FIG. 10 (B) is an explanatory view showing how to form stator core sheets according to a conventional example.

MODE FOR CARRYING OUT THE INVENTION

Referring to the accompanying drawings, embodiments of the present invention will be described for a better understanding of the invention.

Figure 1:
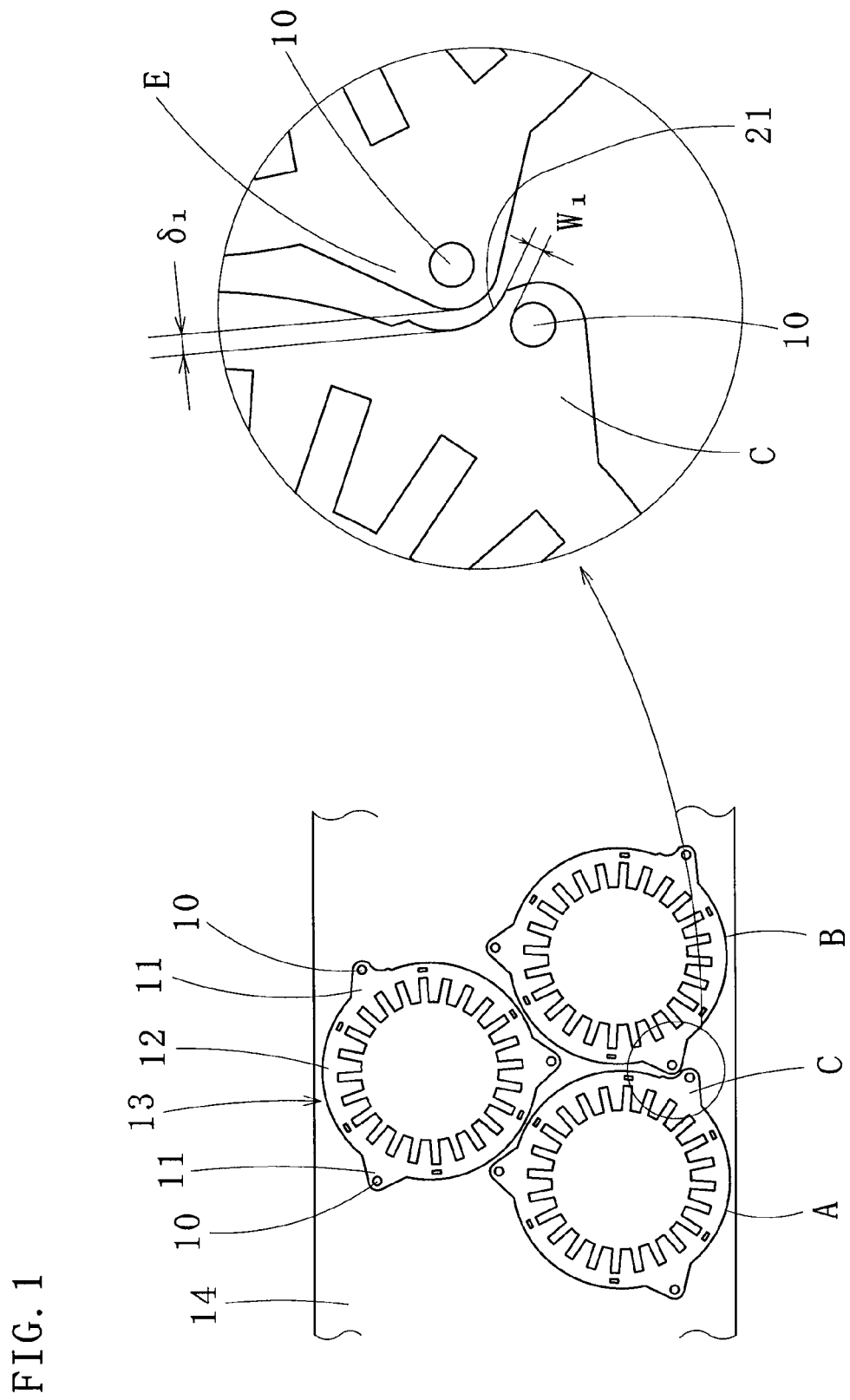
FIG. 1 shows how to form stator core sheets from a strip material in a method of manufacturing a laminated stator core according to a first embodiment of the present invention.
Figure 2:
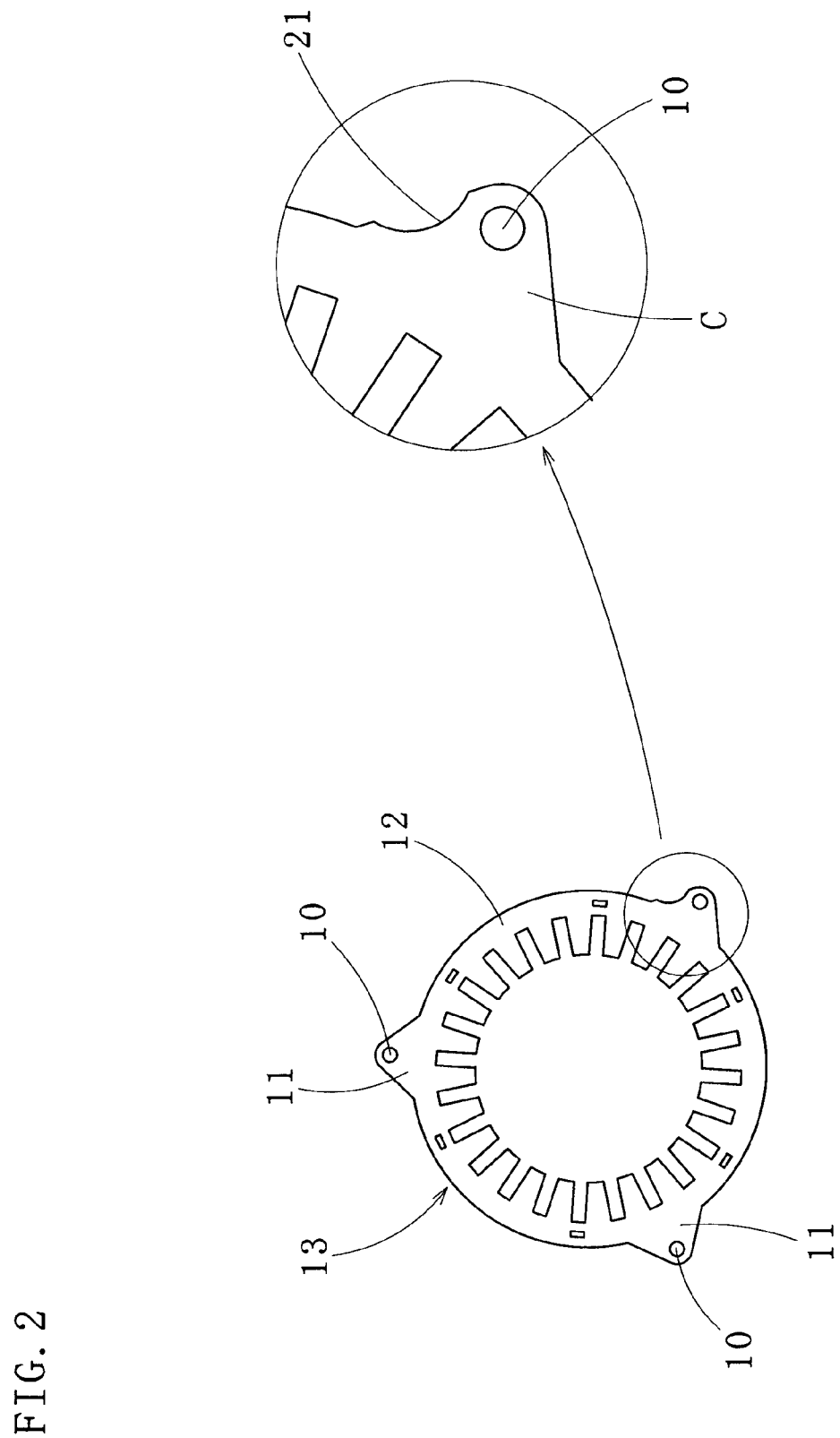
FIG. 2 is a plan view of a stator core sheet formed by the method of manufacturing the laminated stator core.
Figure 3:
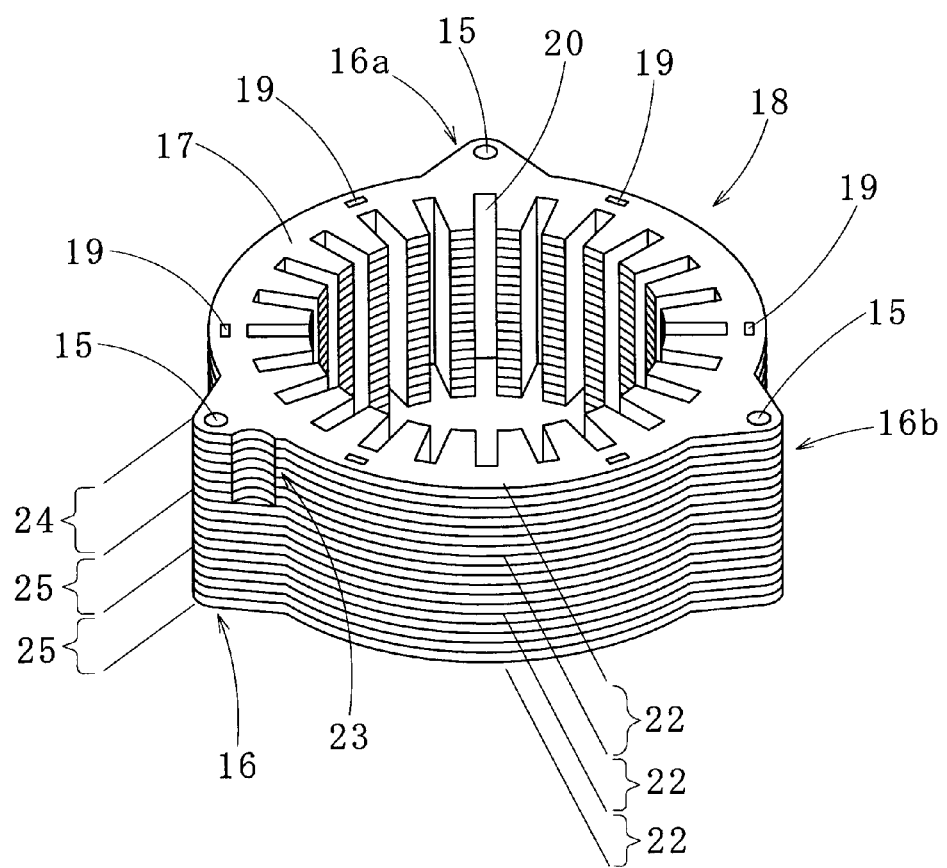
FIG. 3 is a perspective view of a laminated stator core formed by the method of manufacturing the laminated stator core.

As shown in FIGS. 1 to 3, in a method of manufacturing a laminated stator core according to a first embodiment of the present invention, stator core sheets 13 are punched out (i.e., one example process of forming outlines of the stator core sheets) in two lines (an example of plural lines) from a strip material 14, which is, e.g., a magnetic steel metal with a thickness of 0.2-0.5 mm, and the plural stator core sheets 13 are stacked one on another to form a laminated stator core 18. The stator core sheet 13 includes ear pieces 11 formed at equal spaces in a circumferential direction of an annular yoke piece 12. When viewed from the above, the ear piece 11 has a chevron-shape (inverted V-shape), projecting radially outward from the annular yoke piece 12. The ear piece 11 includes a through-hole 10 in its center. The laminated stator core 18 includes an annular yoke 17 formed by laminating the annular yoke pieces 12. In a circumferential direction of the annular yoke 17, ears 16, 16a, and 16b are formed by laminating the ear pieces 11. Each of the ears 16, 16a, and 16b includes a bolt-hole 15 formed by the through-holes 10. In the figures, a reference numeral 19 shows an interlocking portion for connecting the vertically-adjoining stator core sheets 13. A reference numeral 20 shows a slot of the laminated stator core 18. Hereinafter a detail description will be given.

FIG. 1 shows a layout of the stator core sheets 13 in the strip material 14 in the method of manufacturing the laminated stator core according to the first embodiment of the present invention. The stator core sheets 13, before being punched out, are arranged adjacent to each other in a longitudinal direction of the strip material 14. One of the adjacent stator core sheets 13 (hereinafter referred to as the stator core sheet A) includes a recess 21 formed in a lateral portion of at least one ear piece 11 (hereinafter referred to as the ear piece C). The other stator core sheet 13 (hereinafter referred to as the stator core sheet B) is formed in a manner that one ear piece 11 (hereinafter referred to as the ear piece E) of the stator core sheet B is fitted in the recess 21 of the stator core sheet A with a gap. With this layout, the stator core sheets A, B can be formed in the strip material 14 with the narrow gap therebetween.

A width $W_1$ of an area between the through-hole 10 formed in the ear piece C and the recess 21 formed in the lateral portion of the ear piece C is equal to (or may be larger than) a difference between a flange radius of a bolt to be inserted in the bolt-hole 15 and a radius of the through-hole 10. This setting prevents an excessive increase of the width $W_1$ and deformation of the ear piece C, which may be caused by, for example, buckling when the ear piece C is bolted down. Now, the recess 21 of the stator core sheet A has a circular-arc shape, which prevents an interference between the recess 21 of the stator core sheet A and the ear piece E of the stator core sheet B when the ear piece E is fitted in the recess 21 with the gap. A width $\delta_1$ of the gap can be reduced as well. In addition, the width $\delta_1$ of the gap between the recess 21 of the stator core sheet A and the ear piece E of the stator core sheet B is two to twenty times the thickness of the strip material 14. Thus, the stator core sheet B can be punched out without worsening positioning accuracy and feeding of the strip material 14, while the gap is prevented from being unnecessarily wide. As a result, the stator core sheets 13 can be punched out from the strip material 14 with the high yield, and thereby the use of the strip material 14 and the material cost can be reduced.

When the adjacent stator core sheets 13 are punched out, the ear piece E of the stator core sheet B is fitted in the recess 21 of the stator core sheet A, and thus the width $\delta_1$ of the gap between the stator core sheets A, B can be narrowed. Accordingly, the punching die for the stator core sheets 13 can be small, reducing the cost of the punching die. Further, if the size of the punching die is increased, an existing press machine needs to be replaced with a new press machine corresponding to the larger-sized punching die, but this necessity is no longer present. As a result, the manufacturing cost of the laminated stator core can be further reduced.

Hereinafter, a description will be given on the laminated stator core 18 manufactured by the method of manufacturing the laminated stator core according to the first embodiment of the present invention.

The laminated stator core 18 is manufactured by laminating the stator core sheets 13 punched out from the strip material 14 with the high yield. Thus, the material cost and the manufacturing cost of the laminated stator core 18 can be reduced.

As shown in FIG. 3, the laminated stator core 18 is formed with the plural (three in FIG. 3) laminated stator core blocks 22. Each of the laminated stator core blocks 22 is formed by laminating the plural stator core sheets 13 such that the ear pieces C are vertically aligned. The laminated stator core block 22 is rotated before being laminated on the subjacent laminated stator core block 22. Thus, cutouts 23, formed by laminating the recesses 21, of the laminated stator core blocks 22 are located in different parts of the laminated stator core 18. Therefore, a boundary surface between the laminated stator core blocks 22 of the laminated stator core 18 can be visually confirmed with ease.

The width $W_1$ of the area between the through-hole 10 of the ear piece C and the recess 21 is the difference between the flange radius of the bolt to be inserted in the bolt-hole 15 and the radius of the through-hole 10. Thus, even if the ear piece C includes the recess 21, the distortion of the ear piece C is prevented. For this reason, in the laminated stator core block 22, strength of an ear block 24 formed by laminating the ear pieces C is prevented from being lower than that of an ear block 25 formed by laminating the ear pieces 11 without the recess 21. As a result, the deterioration in strength of the ears 16, 16a, and 16b can be prevented in the laminated stator core 18 made of the plural laminated stator core blocks 22.

Compared to the method of manufacturing the laminated stator core according to the first embodiment of the present invention, a method of manufacturing a laminated stator core according to a second embodiment of the present invention has the features described below.

Figure 4:
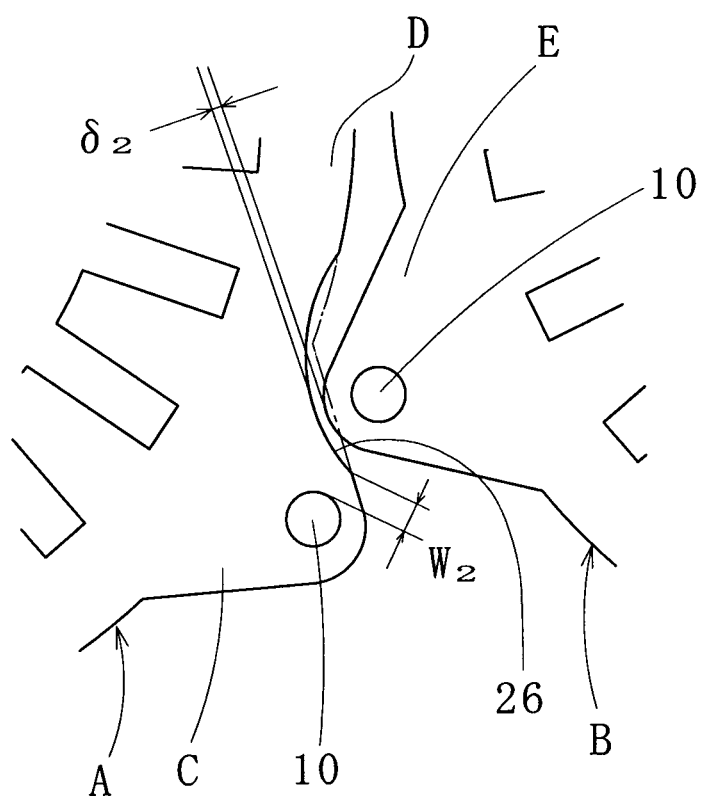
FIG. 4 is a partial enlarged view showing how to form stator core sheets from a strip material in a method of manufacturing a laminated stator core according to a second embodiment of the present invention.

As shown in FIG. 4, in the formation of the stator core sheets from the strip material, the stator core sheets before being punched out are adjacently arranged in the longitudinal direction of the strip material. Specifically, one of the adjacent stator core sheets, i.e., the stator core sheet A, includes one recess 26 placed over both of (a) a lateral portion of the ear piece C of the stator core sheet A and (b) an outer periphery of an annular yoke piece D adjoining to the lateral portion of the ear piece C. The stator core sheet B is formed in a manner that the ear piece E of the stator core sheet B is fitted in the recess 26 of the stator core sheet A with a gap having a width $\delta_2$. In the figures, the common components are represented by the same reference numerals and the description thereof is omitted.

Hereinafter, descriptions will be omitted on the functions common to the methods of manufacturing the laminated stator cores according to the first and second embodiments. In short, descriptions will be given only on unique functions of the method of manufacturing the laminated stator core according to the second embodiment.

In the method of manufacturing the laminated stator core according to the second embodiment, the recess 26 is placed over both of (a) the lateral portion of the ear piece C and (b) the outer periphery of the annular yoke piece D adjoining to the lateral portion of the ear piece C. In other words, the recess 26 extends from a bottom of the lateral portion of the chevron-shaped ear piece C to the annular yoke piece D adjoining the ear piece C. And, the ear piece E of the stator core sheet B is fitted in the recess 26 of the stator core sheet A with the gap. Then, a distance between the ear pieces C, E of the stator core sheets A, B is wider than that in the method of manufacturing the laminated stator core according to the first embodiment. Therefore, even when a depth of the recess 26 is shallow, the ear piece E of the stator core sheet B is fitted in the recess 26 with the gap having the width $\delta_2$ narrower than the width $\delta_1$ in the first embodiment.

In view of the above, the stator core sheets can be punched out from the strip material with the high yield, and the strip material usage and the material cost can be reduced.

In addition, the recess 26 can be shallower than that in the method of manufacturing the laminated stator core according to the first embodiment. Thus, a width $W_2$ of the area between the through-hole 10 formed in the ear piece C and the recess 26 formed in lateral portion of the ear piece C is wider than the width $W_1$ in the first embodiment. Therefore, the deformation of the ear piece C can be further prevented.

Referring to the FIG. 5, a description will be given on a laminated stator core 27 manufactured by the method of manufacturing the laminated stator core according to the second embodiment of the present invention. The components in common with the laminated stator core 18 manufactured by the method of manufacturing the laminated stator core according to the first embodiment are represented by the same reference numerals and the description thereof is omitted.

The laminated stator core 27 is formed by laminating stator core sheets punched out from a strip material in higher yield. Thus, the material cost and the production cost of the laminated stator core 27 can be reduced.

Figure 5:
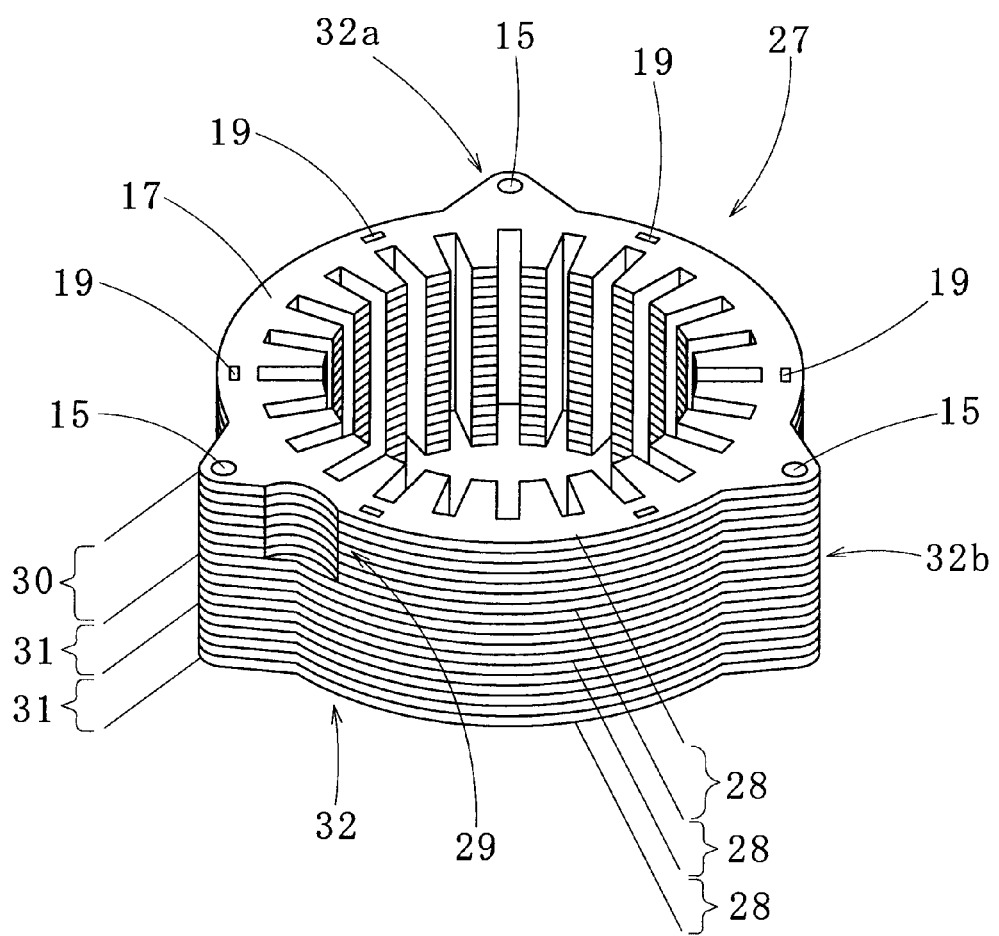
FIG. 5 is a perspective view of a laminated stator core formed by the method of manufacturing the laminated stator core.

As shown in FIG. 5, the laminated stator core 27 is formed with the plural (three in FIG. 5) laminated stator core blocks 28. Each of the laminated stator core blocks 28 is formed by laminating the plural stator core sheets such that the ear pieces C are vertically aligned. Now, (a) a distance between the bolt-hole 15 of the laminated stator core 27 and a cutout 29 of the laminated stator core block 28 formed by laminating the recesses 26 is longer than (b) a distance between the bolt-hole 15 of the laminated stator core 18 and the cutout 23 of the laminated stator core block 22 formed by laminating the recesses 21 in the first embodiment. For this reason, in the laminated stator core 27, strength of an ear block 30 formed by laminating the ear pieces C with the recesses 26 is prevented from being lower than that of an ear block 31 formed by laminating the ear pieces 11 without the recesses 26. As a result, the deterioration in the strength of ears 32, 32a, and 32b can be prevented in the laminated stator core 27 made of the plural laminated stator core blocks 28.

Compared to the method of manufacturing the laminated stator core according to the first embodiment of the present invention, a method of manufacturing a laminated stator core according to a third embodiment of the present invention has the features described below.

Figure 6:
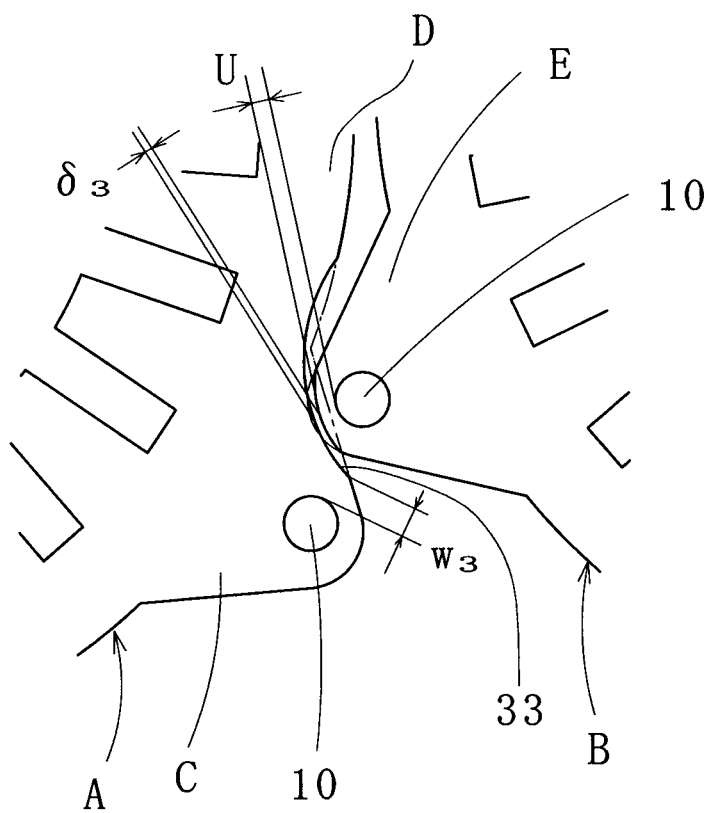
FIG. 6 is a partial enlarged view showing how to form stator core sheets from a strip material in a method of manufacturing a laminated stator core according to a third embodiment of the present invention.

As shown in FIG. 6, in the formation of the stator core sheets from the strip material, the stator core sheets before being punched out are adjacently arranged in the longitudinal direction of the strip material. Specifically, one of the adjacent stator core sheets, i.e., the stator core sheet A, includes one recess 33 placed over both of (a) a lateral portion of the ear piece C of the stator core sheet A and (b) an outer periphery of an annular yoke piece D adjoining to the lateral portion of the ear piece C. The stator core sheet B is formed in a manner that the ear piece E of the stator core sheet B is fitted in the recess 33 of the stator core sheet A with a gap having a width $\delta_3$. A tip of the ear piece E is eliminated and flattened. In the figures, the common components are represented by the same reference numerals and the description thereof is omitted.

Hereinafter, descriptions will be omitted on the functions common to the methods of manufacturing the laminated stator cores according to the first and third embodiments. In short, descriptions will be given only on unique functions of the method of manufacturing the laminated stator core according to the third embodiment.

In the method of manufacturing the laminated stator core according to the third embodiment, the recess 33 is placed over both of (a) the lateral portion of the ear piece C and (b) the outer periphery of the annular yoke piece D adjoining to the lateral portion of the ear piece C. In other words, the recess 33 extends from a bottom of the lateral portion of the chevron-shaped ear piece C to the annular yoke piece D on the side of the ear piece C. And, the ear piece E of the stator core sheet B is fitted in the recess 33 of the stator core sheet A with the gap. Then, a distance between the ear pieces C, E of the stator core sheets A, B is wider than that in the method of manufacturing the laminated stator core according to the first embodiment. Further, the tip of the ear piece E of the stator core sheet B is eliminated and flattened. Therefore, even when a depth of the recess 33 is shallow, the ear piece E of the stator core sheet B is fitted in the recess 33 with the gap having the width $\delta_3$ narrower than the width $\delta_1$ in the first embodiment. Now, a width U of an area between the tip of the ear piece E of the stator core sheet B and the through-hole 10 formed in the ear piece E is the difference between the flange radius of the bolt to be inserted in the bolt-hole 15 and the radius of the through-hole 10, which prevents deformation of the ear piece E.

In the case of eliminating the tip of the ear piece E, the tip of the ear piece E can be flattened or rounded to have a large curvature as long as the ear piece E without the tip has a sufficient contact area for a flange surface of the bolt to be inserted in the bolt-hole 15. Preferably, the tip of the ear piece E is rounded to have the large curvature.

In view of the above, the gap between the stator core sheet A and the ear piece E of the stator core sheet B can be further decreased. As a result, the stator core sheets can be punched out from the strip material in the higher yield, and the strip material usage and the material cost can be reduced.

In addition, the recess 33 can be shallower than the recess 21 in the first embodiment. Thus, a width $W_3$ of the area between the through-hole 10 formed in the ear piece C and the recess 33 formed in lateral portion of the ear piece C is wider than the width $W_1$ in the first embodiment. Therefore, the deformation of the ear piece C can be further prevented.

Referring to the FIG. 7, a description will be given on a laminated stator core 34 manufactured by the method of manufacturing the laminated stator core according to the third embodiment of the present invention. The components in common with the laminated stator core 18 manufactured by the method of manufacturing the laminated stator core according to the first embodiment are represented by the same reference numerals and the description thereof is omitted.

The laminated stator core 34 is formed by laminating stator core sheets punched out from a strip material in higher yield. Thus, the material cost and the production cost of the laminated stator core 34 can be further reduced.

Figure 7:
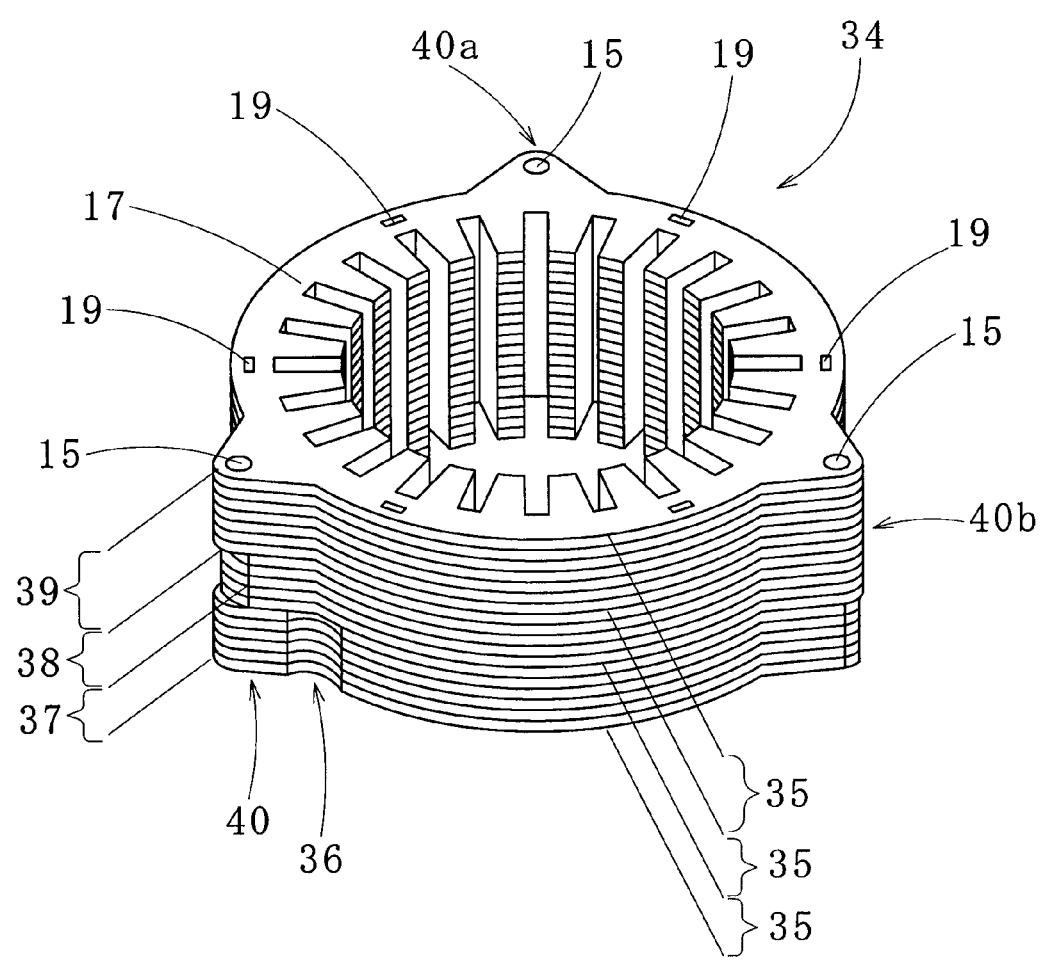
FIG. 7 is a perspective view of a laminated stator core formed by the method of manufacturing the laminated stator core.

As shown in FIG. 7, the laminated stator core 34 is formed with the plural (three in FIG. 7) laminated stator core blocks 35. Each of the laminated stator core blocks 35 is formed by laminating the plural stator core sheets 13 such that the ear pieces C are vertically aligned. Now, (a) a distance between the bolt-hole 15 of the laminated stator core 34 and a cutout 36 of the laminated stator core block 35 formed by laminating the recesses 33 is longer than (b) a distance between the bolt-hole 15 of the laminated stator core 18 and the cutout 23 of the laminated stator core block 22 formed by laminating the recesses 21 in the first embodiment. Also, the width U of the area between the tip of the ear piece E of the stator core sheet B and the through-hole 10 formed in the ear piece E is the difference between the flange radius of the bolt to be inserted in the bolt-hole 15 and the radius of the through-hole 10. For these reasons, strength of an ear block 37 formed by laminating the ear pieces C and an ear block 38 formed by laminating the ear pieces E is prevented from being lower than the strength of an ear block 39 formed by laminating the ear pieces excluding the ear pieces C, E. Here, an end of the ear block 38 includes a flat cutout in the lamination direction since the ear block 38 is formed by laminating the ear pieces E without the tips. As a result, the deterioration in the strength of ears 40, 40a, and 40b can be prevented in the laminated stator core 34 made of the plural laminated stator core blocks 35.

Figure 8:
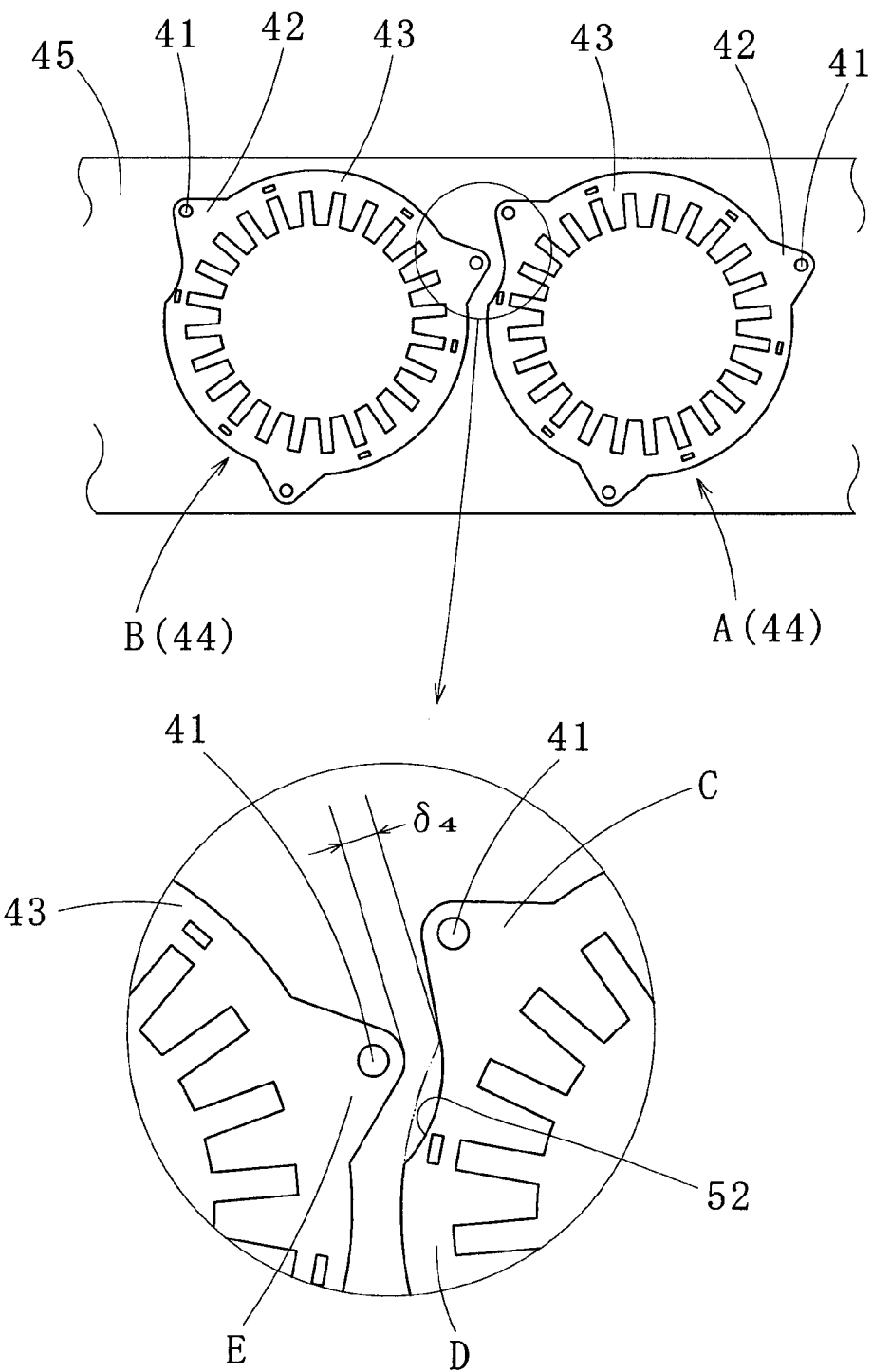
FIG. 8 is a partial enlarged view showing how to form stator core sheets from a strip material in a method of manufacturing a laminated stator core according to a fourth embodiment of the present invention.
Figure 9:
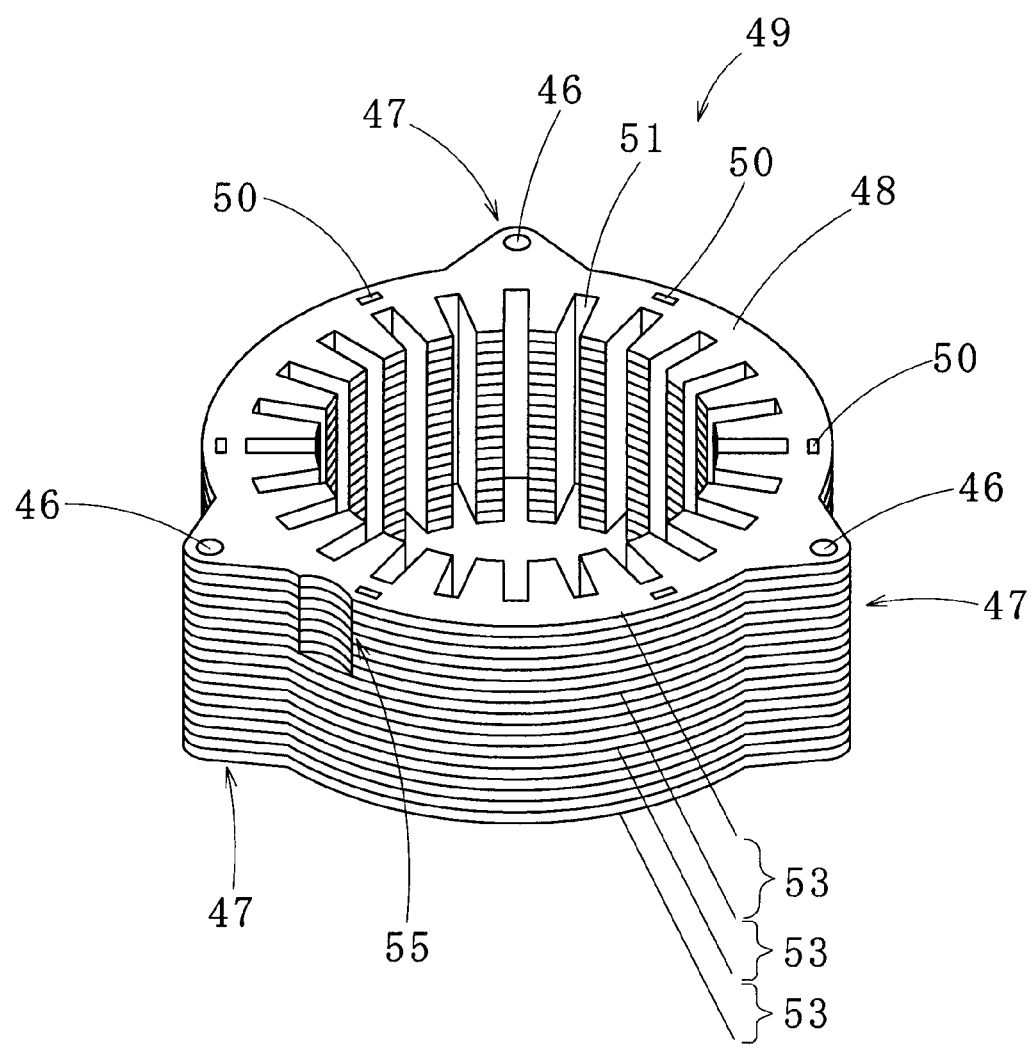
FIG. 9 is a perspective view of a laminated stator core formed by the method of manufacturing the laminated stator core.
Figure 10:
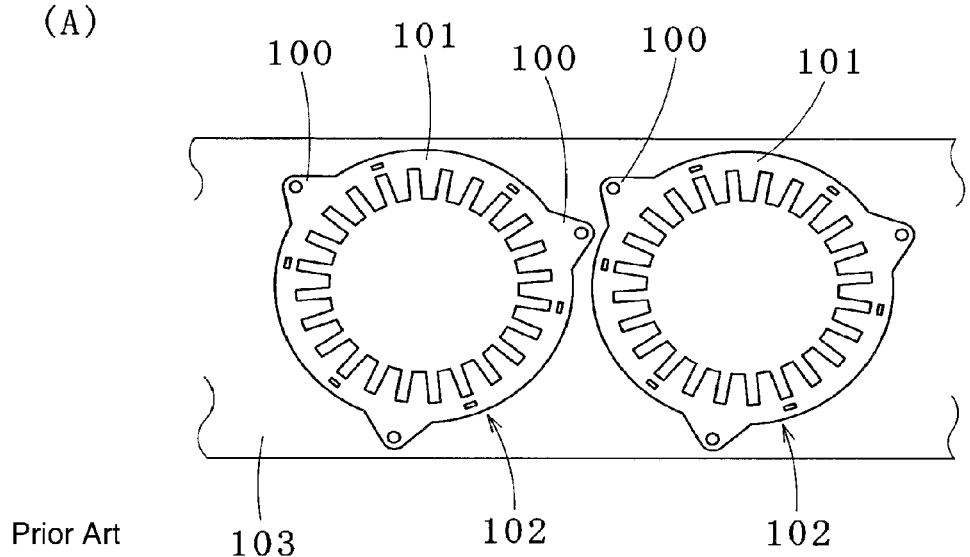
FIG. 10 (A) is an explanatory view showing how to form stator core sheets according to a conventional example.
Figure 10:
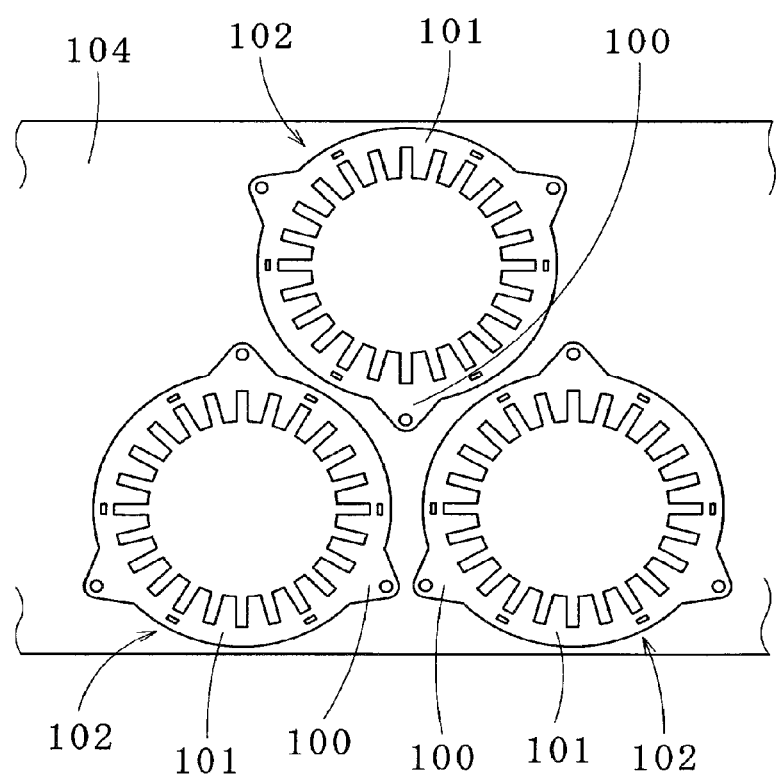
Figure 11:
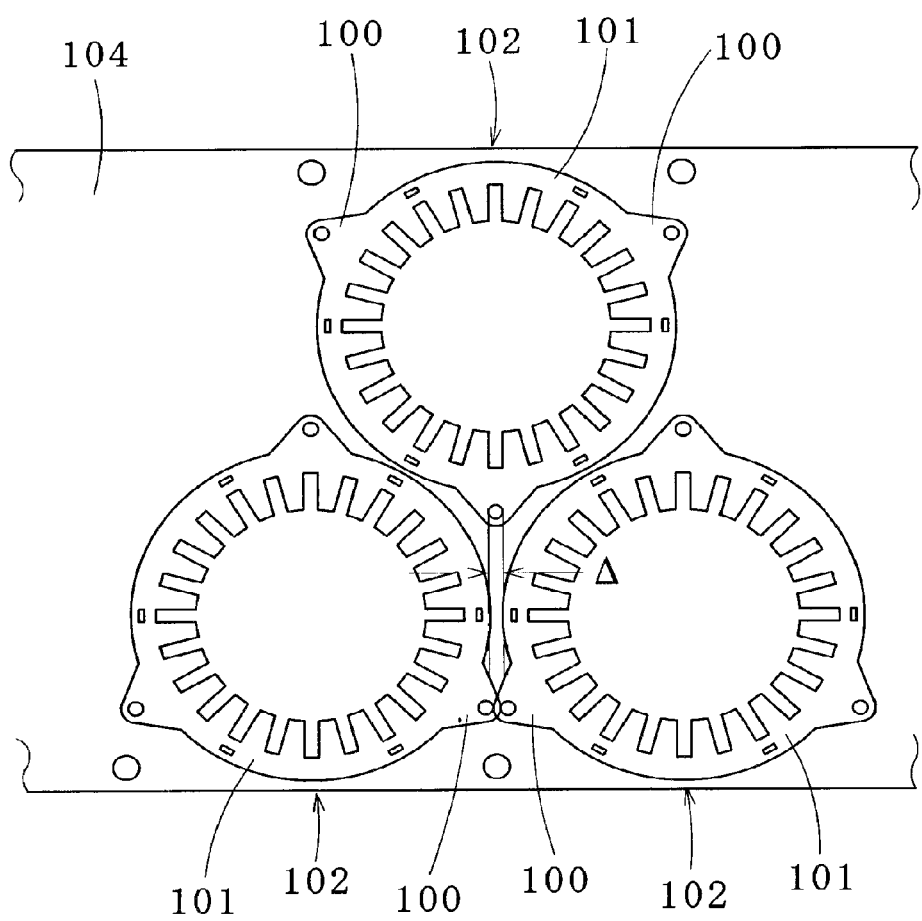
FIG. 11 is an explanatory view of problems in the method of forming stator core sheets according to the conventional examples.

As shown in FIGS. 8 and 9, in a method of manufacturing a laminated stator core according to a fourth embodiment of the present invention, stator core sheets 44 (the adjacent stator core sheets 44 are referred to as stator core sheets A, B) are punched out (i.e., one example process of forming outlines of the stator core sheets) in one line from a strip material 45, which is, e.g., a magnetic steel metal with a thickness of 0.2-0.5 mm, and the plural stator core sheets 44 are laminated to form a laminated stator core 49. The stator core sheet 44 includes ear pieces 42 formed at equal spaces in a circumferential direction of an annular yoke piece 43. When viewed from the above, the ear piece 42 has a chevron-shape (inverted V-shape), projecting radially outward from the annular yoke piece 43. The ear piece 42 includes a through-hole 41 in its center. The laminated stator core 49 includes an annular yoke 48 formed by laminating the annular yoke pieces 43. The annular yoke 48 includes ears 47 formed by laminating the ear pieces 42 in a circumferential direction thereof. Each of the ears 47 includes a bolt-hole 46 formed by the through-holes 41. In the figures, a reference numeral 50 shows an interlocking portion for connecting the vertically-adjoining stator core sheets 44. A reference numeral 51 shows a slot of the laminated stator core 49. Hereinafter a detail description will be given.

FIG. 8 shows a layout of the stator core sheets A, B in the strip material 45 in the method of manufacturing the laminated stator core according to the fourth embodiment of the present invention. The stator core sheets A, B adjacent in a longitudinal direction of the strip material 45 are punched out from the strip material 45. One of the adjacent stator core sheets A, B, i.e., the stator core sheet A includes a recess 52 formed in a peripheral area, which is on the side of an ear piece C, of an annular yoke piece D continuing to a lateral portion of the ear piece C (an example of at least one of the ear pieces 42). The stator core sheet B is formed in a manner that the ear piece E (an example of one ear piece 42 of the stator core sheet B) of the stator core sheet B is fitted in the recess 52 of the stator core sheet A with a gap having a width $\delta_4$. With this layout, the gap between the stator core sheet A and the ear piece E of the stator core sheet B can be narrowed.

Now, the recess 52 of the stator core sheet A has a circular-arc shape, which prevents interference between the recess 52 of the stator core sheet A and the ear piece E of the stator core sheet B when the ear piece E is fitted in the recess 52 with the gap. A width $\delta_4$ of the gap can be reduced as well. In addition, the width $\delta_4$ of the gap between the recess 52 of the stator core sheet A and the ear piece E of the stator core sheet B is two to twenty times the thickness of the strip material 45. Thus, the stator core sheet B can be punched out without worsening positioning accuracy and feeding of the strip material 45, while the gap is prevented from being unnecessarily wide.

As a result, the stator core sheets 44 can be punched out from the strip material 45 in the high yield, and thereby the use of the strip material 45 and the material cost can be reduced.

When the adjacent stator core sheets A, B are punched out, the ear piece E of the stator core sheet B is fitted in the recess 52 of the stator core sheet A, and thus the width $\delta_4$ of the gap between the stator core sheets A, B can be reduced. Therefore, the size of the punching die for the stator core sheets A, B can be small, and the cost of the punching die can be cut down. Further, if the size of the punching die is increased, an existing press machine needs to be replaced with a new press machine corresponding to the larger-sized punching die, but this necessity is no longer present.

Hereinafter, a description will be given on the laminated stator core 49 manufactured by the method of manufacturing the laminated stator core according to the fourth embodiment of the present invention.

The laminated stator core 49 is manufactured by laminating the stator core sheets 44 punched out from the strip material 45 in the high yield. Thus, the material cost and the manufacturing cost of the laminated stator core 49 can be reduced.

As shown in FIG. 9, the laminated stator core 49 is formed with the plural (three in FIG. 9) laminated stator core blocks 53. Each of the laminated stator core blocks 53 is formed by laminating the plural stator core sheets 44 such that the ear pieces C are vertically aligned. The laminated stator core block 53 is rotated before being laminated on the subjacent laminated stator core block 53. Thus, cutouts 55, formed by laminating the recesses 52, of the laminated stator core blocks 53 are located in different parts of the laminated stator core 49. Therefore, a boundary surface between the laminated stator core blocks 53 can be visually confirmed with ease.

As shown in FIG. 8, the recess 52 is formed in the peripheral area, which is on the side of the ear piece C, of the annular yoke piece D continuing to the lateral portion of the ear piece C. Thus, (a) a width of an area between the through-hole 41 formed in the ear piece C and an outer periphery of the ear piece C becomes identical with (b) a width of an area between the through-hole 41 formed in an ear piece not close to the recess 52 and an outer periphery of this ear piece. Accordingly, the strength of the ear block formed by laminating the ear pieces becomes identical with the strength of the ear block formed by laminating the ear pieces not close to the recess 52. In the laminated stator core 49, all the ear blocks 47 have approximately the same strength. If a width of the annular yoke 48 becomes smaller, the strength of the ear blocks 47 is slightly reduced.

In the first to the fourth embodiments, the yield of the strip material from which the stator core sheets are punched out can be improved, for example, by 2-20% compared to the conventional methods. Also, the use of the strip material can be reduced, for example, by 5-25% compared to the conventional methods. As a result, the material cost can be reduced, for example, by 5-25% compared to the conventional methods.

While the embodiments of the present invention have been described above, the present invention is not limited to the above-described embodiments, and other embodiments and various modifications may be made without departing from the scope of the claims.

Further, the present invention includes combinations of elements of the embodiments of the present invention and the other embodiments and modifications. For example, in the method of manufacturing the laminated stator core according to the first and fourth embodiments, the tip of the ear piece of one of the adjacent stator core sheets, which is fitted in the recess of the other stator core sheet, may be eliminated and flattened in order to further reduce the width of the gap therebetween. In the case of eliminating the tip of the ear piece, the tip of the ear piece can be flattened or rounded to have the large curvature as long as the ear piece without the tip has the sufficient contact area for the flange surface of the bolt to be inserted in the bolt-hole 15. Preferably, the tip of the ear piece is rounded to have the large curvature.

The method of manufacturing the laminated stator core according to the present invention has been described based on the example case where the stator core sheets are punched out from the strip material using the punching die. However, the present invention can be applied to the case where the stator core sheets are formed from the strip material by wire electrical discharge machining or laser cutting.

In the present invention, every several stator core sheets are rotated, but every stator core sheet can be rotated before being laminated one on another.

DESCRIPTION OF NUMERALS

10: through-hole; 11: ear piece; 12: annular yoke piece; 13: stator core sheet; 14: strip material; 15: bolt-hole; 16, 16a, 16b: ear; 17: annular yoke; 18: laminated stator core; 19: interlocking portion; 20: slot; 21: recess; 22: laminated stator core block; 23: cutout; 24, 25: ear block; 26: recess; 27: laminated stator core; 28: laminated stator core block; 29: cutout; 30, 31: ear block; 32, 32a, 32b: ear; 33: recess; 34: laminated stator core; 35: laminated stator core block; 36: cutout; 37, 38, 39: ear block; 40, 40a, 40b: ear; 41: through-hole; 42: ear piece; 43: annular yoke piece; 44: stator core sheet; 45: strip material; 46: bolt-hole; 47: ear; 48: annular yoke; 49: laminated stator core; 50: interlocking portion; 51: slot; 52: recess; 53: laminated stator core block; 55: cutout

The invention claimed is:

1. A method of manufacturing a laminated stator core, including forming stator core sheets in one or more lines from a strip material, each of the stator core sheets having an annular yoke piece and chevron-shaped ear pieces, the ear pieces located around the annular yoke piece at equal spaces in a circumferential direction, the ear pieces projecting radially outward from the annular yoke piece, each of the ear pieces having a through-hole; and laminating the plural stator core sheets to form the laminated stator core, the laminated stator core having an annular yoke formed by laminating the annular yoke pieces and ears formed by laminating the ear pieces, the ears located in a circumferential direction of the annular yoke, each of the ears having a bolt-hole formed by the through-holes; the method comprising:

forming a recess over one or both of (a) a lateral portion of at least one ear piece of the stator core sheet to be formed adjacent to the stator core sheet and (b) a peripheral portion of the annular yoke piece continuing to the lateral portion, the peripheral portion beside the ear piece;

forming the stator core sheet such that one ear piece of the stator core sheet is fitted with a gap in the recess of the stator core sheet; and thereby improving a material yield when the stator core sheets are formed from the strip material.

2. The method of manufacturing the laminated stator core according to claim 1, wherein the recess has a circular-arc shape.

3. The method of manufacturing the laminated stator core according to claim 1, wherein the width of the gap is two to twenty times a thickness of the strip material.

4. The method of manufacturing the laminated stator core according to claim 1, wherein a width of an area between the through-hole formed in the ear piece and the recess formed in the ear piece is equal to or larger than a difference between a flange radius of a bolt to be inserted in the bolt-hole and a radius of the through-hole.

5. A laminated stator core manufactured by the method of manufacturing the laminated stator core according to claim 1, comprising:

a cutout formed in a part of one or both of the ear and the annular yoke along a laminating direction.

6. A method of manufacturing a laminated stator core, including forming stator core sheets in one or more lines from a strip material, each of the stator core sheets having an annular yoke piece and chevron-shaped ear pieces, the ear pieces located around the annular yoke piece at equal spaces in a circumferential direction, the ear pieces projecting radially outward from the annular yoke piece, each of the ear pieces having a through-hole; and laminating the plural stator core sheets to form the laminated stator core, the laminated stator core having an annular yoke formed by laminating the annular yoke pieces and ears formed by laminating the ear pieces, the ears located in a circumferential direction of the annular yoke, each of the ears having a bolt-hole formed by the through-holes; the method comprising:

forming a recess over one or both of (a) a lateral portion of at least one ear piece of the stator core sheet to be formed adjacent to the stator core sheet and (b) a peripheral portion of the annular yoke piece continuing to the lateral portion, the peripheral portion beside the ear piece;

forming the stator core sheet such that one ear piece of the stator core sheet is fitted with a gap in the recess of the stator core sheet;

reducing a width of the gap by eliminating a tip of the ear piece; and thereby improving a material yield when the stator core sheets are formed from the strip material.

7. The method of manufacturing the laminated stator core according to claim 6, wherein the recess has a circular-arc shape.

8. The method of manufacturing the laminated stator core according to claim 6, wherein the width of the gap is two to twenty times a thickness of the strip material.

9. The method of manufacturing the laminated stator core according to claim 6, wherein a width of an area between the through-hole formed in the ear piece and the recess formed in the ear piece is equal to or larger than a difference between a flange radius of a bolt to be inserted in the bolt-hole and a radius of the through-hole.

10. A laminated stator core manufactured by the method of manufacturing the laminated stator core according to claim 6, comprising:

a cutout formed in a part of one or both of the ear and the annular yoke along a laminating direction; and a flat cutout formed in a part of a tip of the ear other than the ear having the cutout along the laminating direction.

* * * * *